US005898433A

United States Patent [19]

Hijikata

[11] Patent Number: 5,898,433

[45] Date of Patent: Apr. 27, 1999

[54] 3-D MODEL WINDOW DISPLAY DEVICE

[75] Inventor: Masashi Hijikata, Tokyo, Japan

[73] Assignee: NEC Corporation, Tokyo, Japan

[21] Appl. No.: 08/822,609

[22] Filed: Mar. 19, 1997

[30] Foreign Application Priority Data

Mar. 22, 1996 [JP] Japan .................................... 8-093418

[51] Int. Cl.[6] ...................................................... G06F 15/00

[52] U.S. Cl. .............................................................. 345/344

[58] Field of Search ..................................... 345/340, 341, 345/342, 343, 344, 345, 346

[56] References Cited

U.S. PATENT DOCUMENTS 5,469,540 11/1995 Powers, III et al. .................... 345/340
5,689,666 11/1997 Berquist et al. ......................... 345/345
5,825,360 10/1998 Odam et al. ............................ 345/344

FOREIGN PATENT DOCUMENTS 1-261722 10/1989 Japan .
2-234219 9/1990 Japan .
2-250113 10/1990 Japan .
7-200237 8/1995 Japan .

*Primary Examiner*—Phu K. Nguyen
*Attorney, Agent, or Firm*—Young & Thompson

[57] ABSTRACT

In a 3-D model window display device, depth (Z direction coordinate) quantities are given to all the windows to be displayed, so that they are regarded as arranged in a three-dimensional space. A virtual viewing point is also placed in the three-dimensional space. By projecting the windows onto a projection plane using the virtual viewing point on a real time basis, this device can display the windows which do not have depth quantities, whereby the user can perceive by intuition the overlapped state of the windows in the Z direction or the positional relationship in the virtual three-dimensional space.

12 Claims, 5 Drawing Sheets

3-D MODEL WINDOW DISPLAY DEVICE

BACKGROUND OF THE INVENTION

1. Field of the Invention

The present invention relates to a window system for displaying a single or a plurality of windows overlapping one another on a display screen for display of characters and/or graphics under control of a computer and more particularly, to a window display system for presenting overlapped windows in such a form that a user can comprehend intuitively the overlapped window structure in a user-friendly manner.

2. Description of the Related Art

With respect to a so-called multi-window system for displaying a plurality of windows overlapping one another, there have already been suggested many systems which include (1) a system for presenting the front/back relationship of the windows in a user-friendly manner and (2) a system for depicting the front/back relationship of the windows efficiently.

The present invention is directed to systems of the above type (1). With regard to this type of system, that is, a system for presenting a multiplicity of windows overlapped (or arranged in a Z (depth) direction of a two-dimensional display screen) in a user-friendly manner on the display screen; there have been proposed systems which follow.

Japanese Laid-open Patent Application No. 2-250113 describes a graphic display for presenting graphic elements on a display screen stereoscopically or three-dimensionally by applying shades and shadows to the elements. In this graphic display, since a window frame is also stereoscopically depicted, this makes a boundary with another window more clear and thus the front/back relationship between the windows can be presented in a user-friendly manner.

In the graphic display, further, by applying shades and shadows also to graphic elements within the window and depicting stereoscopically shades and shadows cast by the window itself on a deeper (more distant) window, stereoscopical or three-dimensional array information on the overall display screen can be visually presented in the easy-to-understand manner.

Japanese Laid-open Patent Application No. 1-261722 discloses a multi-window display control system which puts all active windows that are in front of (shallower than) a window now of interest in their non-display state. This multi-window display control system can display only the window now of interest without changing the front/back relationship between the windows. Further, since the window front/back relationship is not changed, this also reduces the possibility of causing the user to get confused by the window front/back relationship.

In this way, the prior art systems presenting the window front/back relationship in a user-friendly manner have in common in that the display screen is arranged to effectively present a three-dimensional array of windows or the like.

The foregoing prior art systems however have problems which follow.

The first problem in the prior art is that, since the outer frames of the windows are contrasting in order to clearly distinguish between the inside and outside of the windows, the window boundary areas represented by the frames may become unnoticeable or unremarkable in some situations. More specifically, though the outer frames of the windows are contrasting by broadening the window frames, presenting them in striking color or stereoscopically, this method leads to the fact that the visual impact of the outer frames of the windows depends on the display content within the window frames. More in detail, the window frames become relatively unremarkable (1) when the graphic images within the window frames have a color tone design more visually noticeable than that of the window frames or (2) when the interior graphic images include a color tone or design very similar to that of the window frames. In this connection, since the graphic images within the window frames can be freely chose by the user, the possibility that the window frames become relatively unnoticeable cannot entirely be avoided.

The second problem in the foregoing prior art systems is that, even if the window frames can be sufficiently distinct, the window front/back (depth) relationship is presented simply by not displaying the hidden window areas of the other windows, for which reason it is difficult to recognize the front/back relationships among a multiplicity of windows.

That is, in the prior art systems, (1) it inevitably becomes hard to recognize the window front/back relationship when the window frames are unnoticeable, and in a certain display screen, (2) the window front/back relationship must be perceived on the basis of the window or the displayed contents (such as figures) of the window frames (for example, perception is such that, although the window is hidden by another window, its window area will be regarded by the user as actually existing). Accordingly, as the windows are overlapped in a more complicated way, it becomes more difficult to recognize the window front/back relationship.

In view of the above problems in the prior art, it is therefore an object of the present invention to provide a 3-D model window display system which, taking an array of windows in their depth direction (Z direction) into consideration, provides a dynamic change to the display coordinates, display scale factor, etc. of each window in response to a movement of a virtual viewing point operated by a user on a real time basis, thereby to give an impression to the user of the windows overlapping in a three-dimensional space. This allows the user to perceive intuitively the boundary areas of the windows or positional relationships therebetween and can improve the ease of use of the window system.

SUMMARY OF THE INVENTION

A first 3-D model window display device in accordance with the present invention comprises:

- first means for receiving first position information of a virtual viewing point including a depth direction attribute;
- second means for receiving second position information of at least one window including depth direction attribute or attributes;
- third means for computing third position information of at least one projection not including depth direction attribute or attributes, obtained by projecting said at least one window onto a projection plane with use of said virtual viewing point on the basis of said first and second position information; and
- fourth means for displaying said at least one projection on a display screen on the basis of said third position information.

Also, said first means moves said virtual viewing point, and said third means changes said third position information of said at least one projection according to the depth direction attribute or attributes of said at least one window corresponding to said at least one projection, when said virtual viewing point is moved by said first means.

Further, said first means moves said virtual viewing point in a plane parallel to said display screen, and said third means changes the position or positions of said at least one projection on said display screen according to the depth direction attribute or attributes of said at least one window corresponding to said at least one projection, when said virtual viewing point is moved by said first means.

Furthermore, said first means moves said virtual viewing point in a plane perpendicular to said display screen, and said third means changes display scaling factor or factors of the at least one projection on said display screen according to the depth direction attribute or attributes of said at least one window corresponding to said at least one projection, when said virtual viewing point is moved by said first means.

Also, said fourth means displays said at least one projection with a lightness or lightnesses according to a distance or distances from said virtual viewing point to said at least one window corresponding to said at least one projection.

Further, said fourth means displays said at least one projection with a transparency or transparencies according to a distance or distances from said virtual viewing point to said at least one window corresponding to said at least one projection.

BRIEF DESCRIPTION OF THE DRAWINGS

Other features and advantages of the invention will be more apparent from the detailed description hereunder taken in conjunction with the accompanying drawings, in which.

DETAILED DESCRIPTION OF THE PREFERRED EMBODIMENTS

Figure 1:
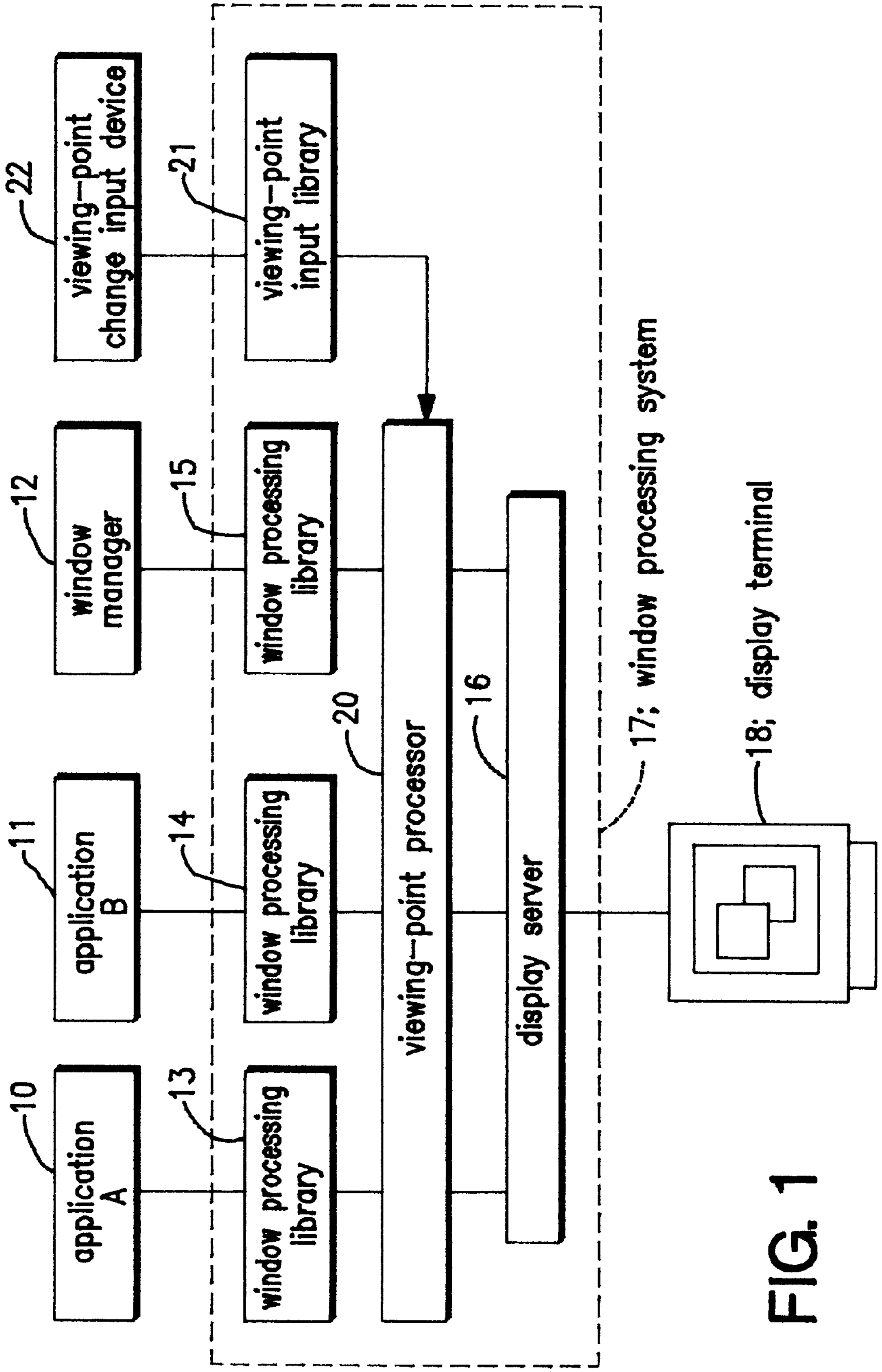
FIG. 1 is a block diagram of an arrangement of a 3-D model window display device in accordance with an embodiment of the present invention.

A 3-D model window display system according to a first embodiment of the present invention holds a single virtual viewing point in the overall window system, and also holds, as attributes, depth (Z-direction coordinates) quantities for all the windows to be displayed, and changes the display states of all the displayed windows according to the depth quantities in response to a movement in the viewing point on a real time basis.

For example, assume that the virtual viewing point is shifted in a plane parallel to the window group. For example, when the virtual viewing point is shifted rightwards in the plane parallel to the window group, the window closest to the viewing point moves relatively farther leftwards than a window more remote therefrom. In an extreme example, the leftward movement of the window located at an infinite point will become zero, when the virtual viewing point is similarly shifted.

Now assume that the virtual viewing point is shifted in a direction perpendicular to the window group. For example, the display contents of all the windows are set to be enlarged when the virtual viewing point is moved in the depth direction, nearer the screen, whereas the display contents are to be reduced when the virtual viewing point is moved reversely to the above, i.e., farther from the screen. In this connection, the display scaling factor (enlargement and reduction) can be changed according to a distance from the virtual viewing point. As an example, the virtual viewing point is set taking into consideration an average distance from the physical display screen to the user's eye, and the scale factor is computed so as to coincide with an apparent magnitude when viewed from the position of the viewing point.

In a three-dimensional coordinate system in which a group of windows are present, the virtual viewing point is assumed to be freely movable. In this case, the display position of a window can be determined by combining a displacement in the display coordinates of the windows when the virtual viewing point is moved in the plane parallel to the window group and a change in the display scale factor (enlargement and reduction) of the windows.

In addition to providing a displacement of the display coordinates and a change of the display scale factor (enlargement and reduction) for a window group as mentioned above, the following special effects (1) and (2) can be applied to the display contents of each window.

That is, for example, (1) a relatively deeper window (farther as viewed from the virtual viewing point) is displayed as darker, and (2) a window very close to the viewing point and therefore greatly enlarged, is caused to become translucent as the window comes closer to the viewing point, whereby more remote windows can be seen through the closer one. In the above effect (2), when the window coincides with the viewing point or comes therebehind, the window can be made completely transparent (non-display).

In this way, the 3-D model window display system of this embodiment of the invention allows the user to see the windows on the screen the same as in the real world, in that a farther window moves more slowly in response to a movement of the viewing point and a closer window moves relatively more in response thereto. This in turn enables the user to perceive intuitively virtual distances between windows and easily grasp the overlapped state of the windows and the array thereof within a virtual three-dimensional space.

The 3-D model window display system of this embodiment likewise allows the user to see the windows the same as in the real world, in that the user can see a farther window smaller and can see a closer window larger, whereby the user can perceive intuitively virtual distances between windows and can easily grasp the overlapped state of the windows and the array thereof within a virtual three-dimensional space.

The 3-D model window display system of the embodiment of the present invention is furthermore configured so that, on the assumption that a light source is located close to the virtual viewing point, the user can see the windows the same as in the real world in that the user sees a farther window as darker and a closer window as lighter, which also lets the user perceive intuitively virtual distances between windows and the overlapped state of the windows within a virtual three-dimensional space.

Explanation will next be made in detail as to the arrangement of this embodiment of the present invention by referring to the accompanying drawings.

The window system shown in FIG. 1 will be explained by dividing the system into the conventional window processing system and the part of the present invention.

In the conventional window processing system, an application (A) 10, an application (B) 11 and a window manager 12 for managing these applications function to allocate display areas (windows) on a display terminal 18 within a window processing system 17 or to draw various contents in their windows through respective window processing libraries 13, 14 and 15.

Explanation will next be directed to the part of the present invention which comprises a viewing point processor 20 within the window processing system 17.

The viewing point processor 20 determines contents to be drawn and the display positions of windows on the display terminal 18 in the similar manner to the conventional window processing system, and further computes the positions of the windows to be actually displayed on the display terminal 18, the scaling factors of the display contents, the lightness and transparency, etc. of the overall window on the basis of the attributes of Z coordinates (depth) of the windows and the single virtual viewing point acquired by the window processing system 17. In the window system of the present embodiment, these computed results are reflected on the display screen immediately, i.e., on a real time basis as interlinked with the user's operation.

Further, the window processing system 17 includes a viewing-point input library 21 as an interface for receiving the position of the externally input viewing point. For the purpose of actually moving the viewing point, a viewing-point change input device 22 connected to the window processing system 17 is used.

Detailed explanation will then be made as to the operation of the viewing point processor 20 which forms a featured part of the window system of the present embodiment.

It is assumed that the window processing system 17 holds, in addition to array information (X, Y) of windows on the plane of the display screen possessed by the prior art window system, attributes for the Z coordinates (depth) of the windows to indicate the arrays of all the windows in a virtual three-dimensional space.

First, the position of the virtual viewing point determined by the viewing-point change input device 22 is input to the window processing system 17 through the viewing-point input library 21, and the window processing system 17 in turn holds the virtual viewing point as a point in the three-dimensional space.

Further, window positions issued from the application (A) 10, application (B) 11 and window manager 12 are input through the respective window processing libraries 13, 14 and 15 to the window processing system 17, which in turn holds the window positions as part of one plane in the three-dimensional space.

The viewing point processor 20 computes the positions of the windows on the display terminal 18 to be located when the windows arranged in the three-dimensional space are viewed from the virtual viewing point. For example, the viewing point processor 20 computes display coordinates for the windows to be located and the scaling factors of the display contents of the windows to be drawn. A display server 16, on the basis of the computed information, performs its actual drawing operation onto the display terminal 18, which operation will be explained with reference to FIG. 2.

It is now assumed that coordinate attributes (depth) in the Z-axis direction are set for the respective windows in the two-dimensional (X, Y) plane and thus the windows are located in a virtual three-dimensional (X, Y, Z) space. In the illustrated example, the windows are illustrated parallel to the XY plane as a natural expansion of the existing window system.

Further, a viewing point E and a projection plane P are set. A point A' as an intersection of the projection plane P and a line segment EA connecting the viewing point E and a point A on one window corresponds to a position at which the point A is actually displayed on the display.

Figure 2:
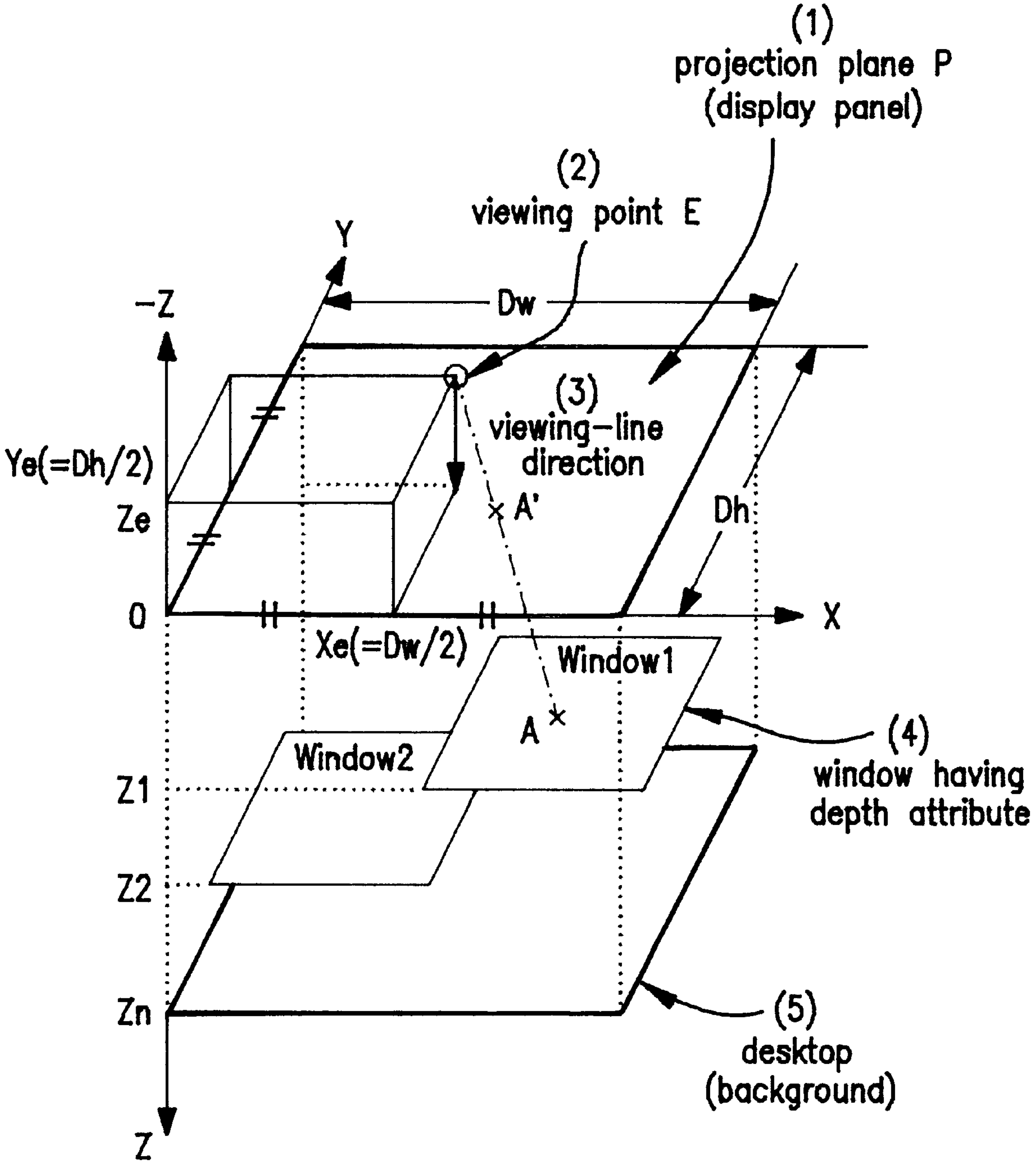
FIG. 2 is a diagram for explaining the operational principle of the 3-D model window display device of the FIG. 1 embodiment.

Assume further that the display area of the display has a width $D_w$ and a height $D_h$, the base of a perpendicular (in the viewing direction) from the point E to the projection plane (display) P always coincides with the center of the display, a distance L (the length of the above perpendicular) from the viewing point to the projection plane is constant in the following description, FIG. 2 shows the projection plane at Z=1, two sides of the rectangle of the projection plane coincide with the abscissa and ordinate of the XY plane and the coordinates (Xe, Ye, Ze) for the viewing point are ($D_w/2$, $D_h/2$, −L).

Depth attributes Zi (i=window number) for the windows are not necessarily positive numbers and have the following relationships among Zi, Ze and 0 (Z coordinates of the projection plane).

1) When Zi>>1, the window i appears very small.
2) When Zi=0, the size of the window i coincides with that of its projection.
3) When 0>Zi>Ze, the window i appears enlarged.
4) When Zi=Ze, the window i appears infinitely enlarged (the same as when one looks at an object with his eyes contacting the same).
5) When Zi<Ze, the user cannot see the window i (as when an object is behind one's head).

The distance L between viewing point E and projection plane P and the depths (e.g., conversion coefficient α between Z order and Z coordinates) of the windows should be adjusted according to user's preferences.

Advancing the explanation with the positional relationship of FIG. 2, the prior art window system can be considered to correspond to:

1) when the Z order (the deeper the window, the larger its Z order) of the windows is merely a multiple of α to use it as its Z coordinates and α is set at 0.
2) when the distance L between the viewing point E and projection plane P is set at infinity. That is, the present system of the invention includes the prior art window system with respect to how the windows look.

When coordinates (Xt, Yt) on the display terminal 18 as projection results of the window group arranged in the three-dimensional space onto the two-dimensional plane are instructed with use of an input device such as a touch panel or a mouse, the viewing point processor 20, on the basis of the coordinates (Xt, Yt) on the display terminal 18 and the coordinates of the virtual viewing point, computes coordinates (Xt', Yt') corresponding to the window coordinate system prior to the viewing-point processing. Thus, this enables accurate judgement of one of the windows to which the user gave his instruction.

Figure 3:
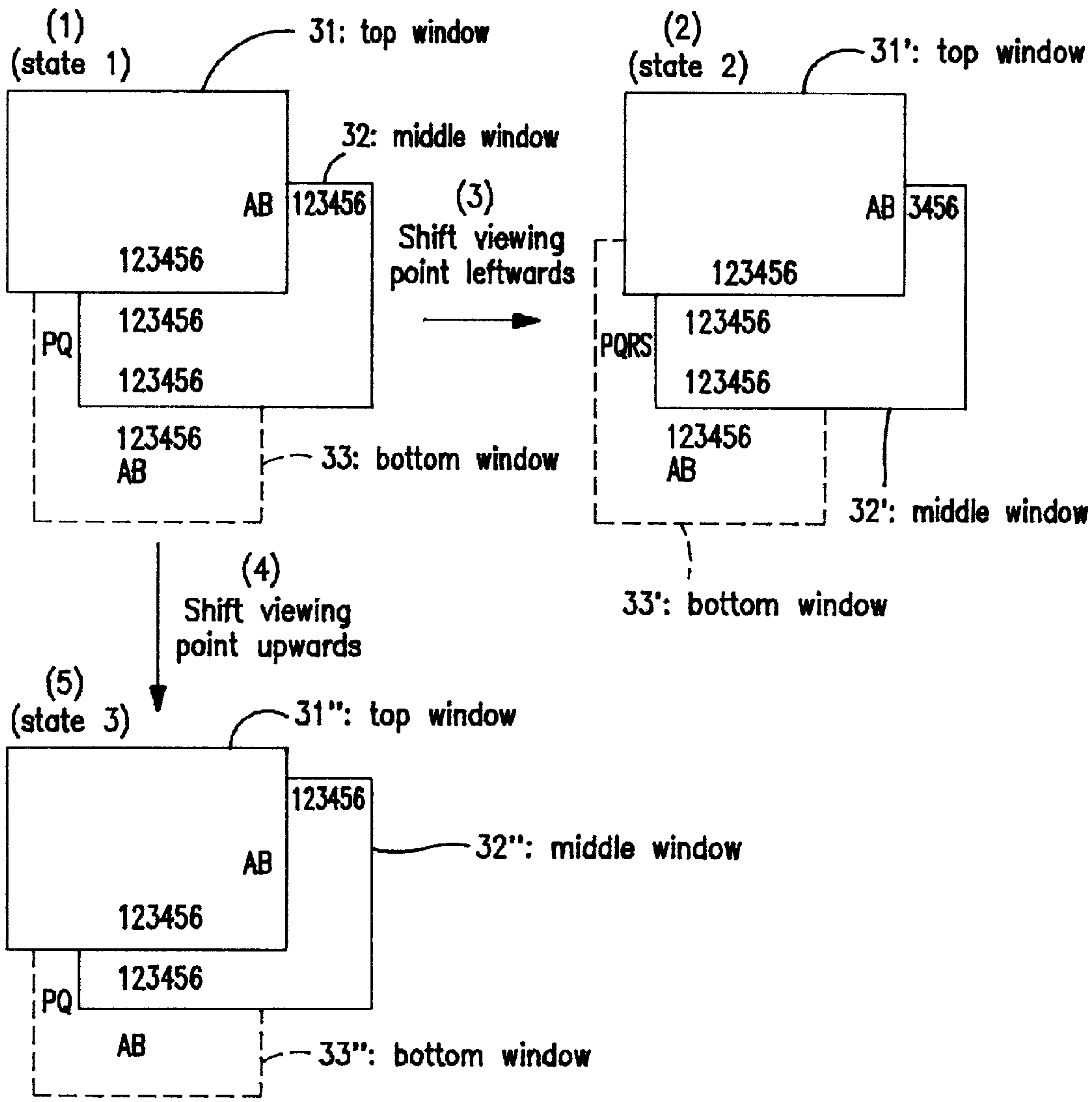
FIG. 3 is a diagram showing how the display of a display screen changes in the depth-ed window display device of the FIG. 1 embodiment.

Shown in FIG. 3 is how the display state on the display screen varies in the 3-D model window display system of the embodiment of the present invention. Explanation will be made as to how the windows on the display terminal 18 actually vary, by referring to FIG. 3. The subject matter of the present invention is the dynamic display change, and thus there are many intermediate states even between the two static states illustrated in FIG. 3.

As shown in FIG. 3, (State 1) denotes an initial display state on the display terminal 18. Illustrated in the drawing in the Z coordinate order are a top window 31 which is located closest (top in the depth direction), a middle window 32 which is located behind the top window, and a bottom window 33 which is located farthest (bottom in the depth direction) among the three windows. As in the prior art window system, in this static condition, the bottom window 33 is partly hidden by the middle window 32 overlapping therewith, while the windows 33 and 32 are partly hidden by the window 31 overlapping therewith.

Explanation will first be made as to how the display state of the display terminal 18 is changed from the initial state (State 1) when the virtual viewing point is moved leftwards in a plane parallel to the window group. A display state after the above change is denoted by (State 2).

Although a character string "PQ" can be seen at the upper left of the bottom window 33 in the (State 1), the remaining part of the character string is still hidden by the middle window 32. When the viewing point is now shifted leftwards, this causes such an operation that the user just looks at the remaining continuous part of the character string hidden by the window 32, which results in that a character string "PQRS" on a bottom window 33' in the (State 2) can be seen on the display terminal 18.

In this way, that part of contents of a farther (deeper) window hidden by another window can come into view by a movement of the viewing point. Thus, when the user wants to temporarily see the hidden part, the above feature offers the user a comfortable means, though this is a secondary effect of the present invention.

Through the above display shift, the user can perceive the front/back relationship between the middle and bottom windows 32 and 33 in the (State 1). Through the magnitude of a difference between a movement (displacement) from the middle window 32 to the middle window 32' and a movement (displacement) from the bottom window 33 to the bottom window 33', that is, through a movement rate, the user can perceive the depth of the windows more assuredly.

In response to a movement of the viewing point by a given amount, the window located very close to the viewing point is moved relatively far within user's view field (display terminal 18), whereas the window located farther from the viewing point is moved much less. This relationship can be verified by reference to (State 2) wherein, after the viewing point is shifted leftwards, a character string "123456" being displayed at the bottom center of the top window 31 is shifted farther right than identical character strings "123456" vertically aligned on the middle and bottom windows 32 and 33 in the (State 1). In reality, due to the difference of this movement amount (movement rate), the user can also perceive not only the front/back relationship between the windows but also the distance therebetween.

Explanation will next be made as to a change from the initial state (State 1) to a display state on the display terminal 18 when the virtual viewing point is shifted upwards in a plane parallel to the window group. The changed display state is denoted by (State 3).

This case is exactly the same in principle as the aforementioned case, except that the movement direction of the viewing point is perpendicular to that of the case from the (State 1) to the (State 2). To explain the display changing manner conceptually, since the display state is changed from the (State 1) in which the user sees the window group from its lower side to the (State 3) in which the viewing point is moved upwardly, a part of a window located farther (deeper) becomes hidden.

In this connection, in the display transition from the (State 1) to the (State 2) and the display transition from the (State 1) to the (State 3) exemplified in FIG. 3, a number of intermediate states are preferably provided even between the illustrated states to be seen more smoothly by the user. The present invention exhibits good effects especially when such conditions as mentioned above are satisfied.

The movement of the viewing point in the plane parallel to the window group has been observed in the form of the display change in the foregoing. In actuality, when the viewing point comes closer to the window group, that is, when the viewing point is moved nearer in a direction perpendicular to the windows, the respective windows can be seen as enlarged. In this case, the enlargement is not simple enlargement but mapping into a two-dimensional plane when the inside of a three-dimensional space is viewed from the virtual viewing point, so that the display coordinates are also varied.

The principle of the above operation will be explained by referring to FIG. 4.

Figure 4:
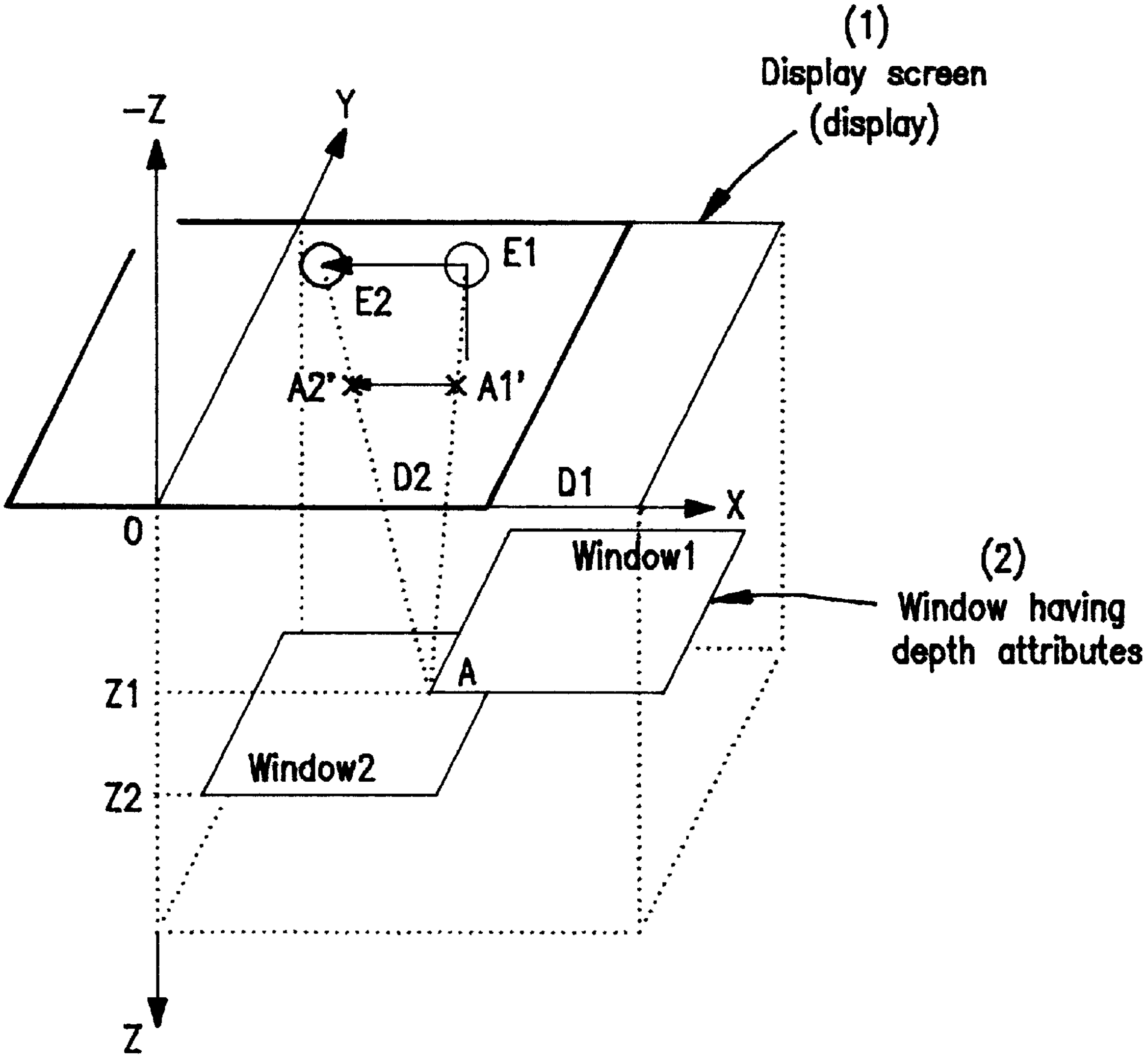
FIG. 4 is a diagram explaining the operational principle of how the display of a display screen changes in the 3-D model window display device of the FIG. 1 embodiment.

In FIG. 4, a projection plane is set so that the base of the perpendicular from a virtual viewing point to the projection plane coincides with the center of the projection plane. Accordingly, when viewing point E1 is moved leftwards (in a negative X direction), the projection plane D1 also moves leftwards (in the negative X direction). When the viewing point comes to a position E2, the projection plane comes to a position D2. At this time, a point A in a Window 1 is shifted from a position A1' in the plane D1 to a point A2' in the plane D2. This movement is directed in the negative X direction in an absolute coordinate system, but when it is viewed with the projection plane fixed, the user can see the point A as if it is moved in a position X direction (that is, the leftward movement of the viewing point causes the user to see the object as if it were moved rightwards).

Figure 5:
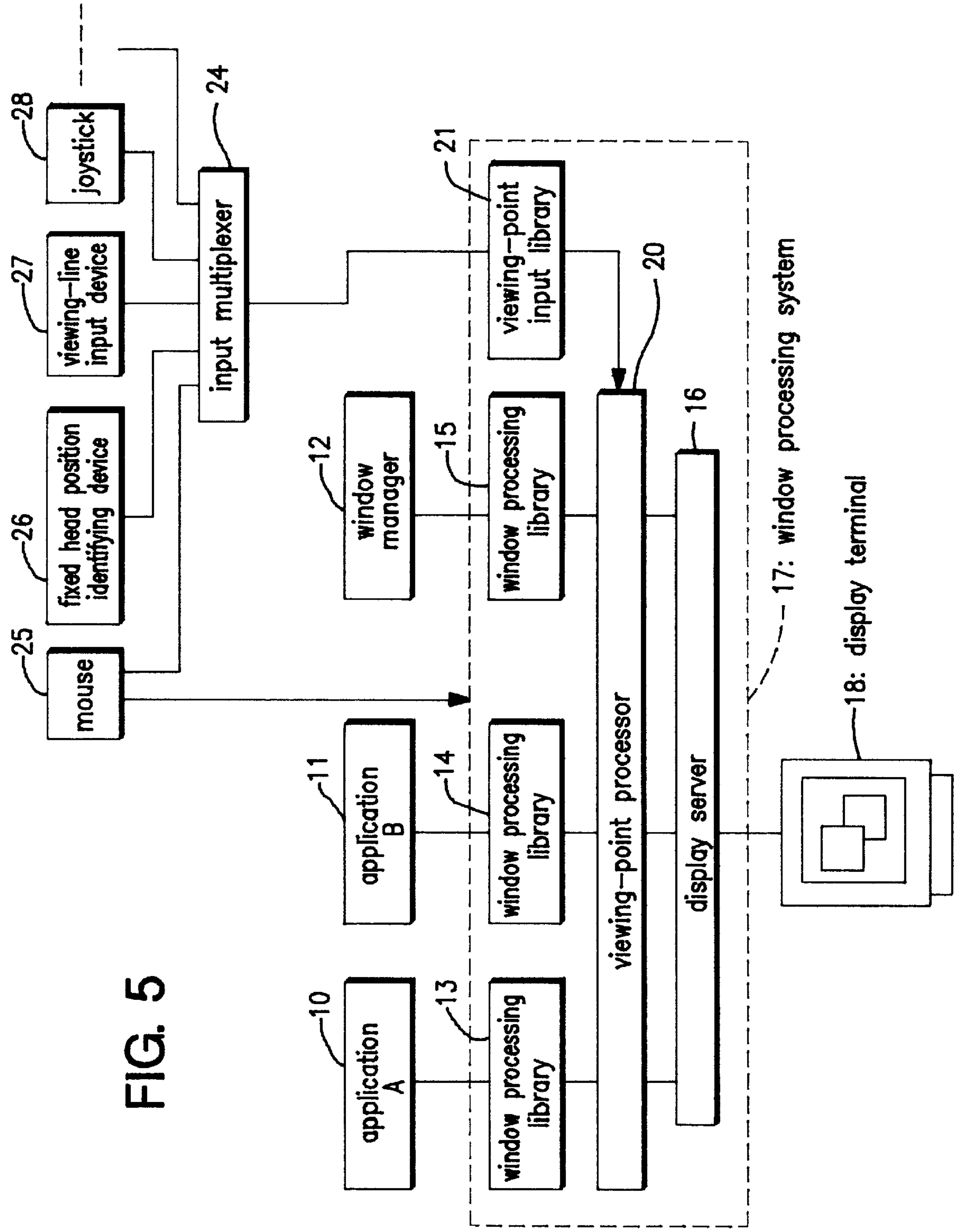
FIG. 5 is a block diagram of a specific arrangement of a viewing-point changing input device in the FIG. 1 embodiment.

Referring next to FIG. 5, explanation will now be made of a specific arrangement of a viewing-point change input device in the window system using the 3-D model window display system of the present embodiment. In FIG. 5, parts denoted by the same reference numerals or symbols as those in FIG. 1 have the same functions and thus explanation thereof is omitted.

The virtual viewing point set in the window processing system 17 can be freely moved in the three-dimensional space, but only part of this function may be utilized as necessary.

Explanation will now be made in connection with a case where, for example, a mouse 25 is used as an input device. The mouse 25 is a pointing device with which the user specifies one point on the plane of the display screen in the window system. However, when the window system is arranged so that the shift amount of the specified point is also input to the viewing-point input library 21, the viewing point can be moved in the plane parallel to the window group. In other words, the input device used in the prior art window system can be expanded for use in the window system of the present invention.

The user selects whether to send an input from the mouse 25 to the viewing-point input library 21 as necessary. As an example, there can be employed such a method that, only when the user moves the mouse 25 while depressing one of the buttons of the mouse, the movement of the viewing point can be realized through the viewing-point input library 21.

As a result, after moving the viewing point, the user can utilize the window processing system 17 as in the prior art window system.

Further, a fixed head position identifying device 26 mounted on user's head may be used for moving the viewing point. In this case, a distance from the display terminal 18 to user's eyeball position may be three-dimensionally grasped by the identifying device to be input to the viewing-point input library 21. Alternatively, a viewing-line input device 27 or a joystick 28 may be used for moving the viewing point. In addition, a suitable combination of these input devices may be connected to the viewing-point input library 21 through an input multiplexer 24. For example, such a combination may be employed that the movement of the viewing point in the plane parallel to the window group is carried out with use of the mouse 25 and the vertical movement thereof is carried out with use of the joystick 28.

Hardware for causing the display change of the display terminal 18 on a real time basis as linked with such an input device as the mouse 25, fixed head position identifying device 26, viewing-line input device 27 or joystick 28, can be selected from a variety of well-known techniques.

Although the present invention has been explained in connection with preferred embodiments of the invention, the invention is not limited to examples disclosed, but includes various alternative embodiments such as an embodiment wherein the front/back relationship between a group of windows is expressed in terms of Z coordinates in a three-dimensional space, the user can intuitively perceive the inter-window front/back relationship by looking at these windows from the virtual viewing point located in the three-dimensional space, that is, by freely moving the virtual viewing point dynamically.

For example, modifications which follow correspond to natural expansions of the present invention and are included in the scope of the present invention.

In the window system of the foregoing embodiments, for example, the user could not only set the viewing line direction in the direction perpendicular to the window group, but also change the viewing line direction per se.

Further, the window system of the foregoing embodiments may be arranged so that multiple stages of lightnesses are provided on a real time basis in such a manner that a farther window is presented darker and a closer window is presented lighter according to the enlargement factors of the windows, whereby the user can perceive the near and far distance impression of the windows by intuition.

Furthermore, the window system of the foregoing embodiments may be arranged so that the transparency of windows located in the vicinity of the virtual viewing point is incremented in multiple stages, and, when the window comes very close to the viewing point or moves to the opposite side of the virtual viewing point, the window is made completely transparent or unseen, whereby the user can naturally perceive the manner of the viewing point moving in the three-dimensional space.

Still further, in the window system of the foregoing embodiments, the movement of the viewing point may be fixed within the plane parallel to the window group, the scaling factor may be set always at 1 regardless of the Z coordinates of the windows (that is, farther windows are not presented as reduced), whereby the user can perceive the window front/back relationship only by respective displacements of the windows in the plane of the display screen in response to a movement of the viewing point.

The 3-D model window display system of the present invention, in response to changes of the respective windows in the three-dimensional space caused by a movement of the virtual viewing point by user's operation, performs moving, enlarging or reducing operation on the display, that is, adds such presentation as depth to the plural windows according to user's operation (such presentation has not been realized in the prior art window system giving only a planar presentation), whereby the user can perceive intuitively the overlapped state of the windows in the Z direction or the positional relationship in the virtual three-dimensional space, and the ease of use or operability of the system can be improved even when plural windows are overlapped in a complicated manner.

In accordance with the present invention, further, since the movement amounts of the windows when the virtual viewing point is shifted depends on the depth direction attributes of the windows, the user can recognize a region moving at an identical speed as a single window and can clearly grasp the boundary area of the window. As a result, when the window frames are not presented in a striking manner or even when window display contents more noticeable than the window frames are used, the user can recognize the window area of interest without any confusion.

In accordance with the present invention, furthermore, since a window located closer to the user is moved farther than a window located deeper in response to a movement of the viewing point in the plane parallel to the windows, the user can see part of the deeper window only by moving the virtual viewing point, whereby the user can temporarily see that part of the deeper window hidden by the shallower window without need for changing the window front/back relationship.

Although the invention has been described in detail above in connection with the various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A 3-D model window display device, comprising:

first means for receiving first position information of a virtual viewing point including a depth direction attribute;

second means for receiving second position information of at least one window including a depth direction attribute;

third means for computing third position information of at least one projection not including depth direction attribute or attributes, obtained by projecting said at least one window onto a projection plane with use of said virtual viewing point on the basis of said first and second position information; and fourth means for displaying said at least one projection on a display screen on the basis of said third position information.

2. The display device as claimed in claim 1, wherein:

said first means moves said virtual viewing point; and said third means changes said third position information of said at least one projection according to the depth direction attribute or attributes of said at least one window corresponding to said at least one projection, when said virtual viewing point is moved by said first means.

3. The display device as claimed in claim 2, wherein:

said fourth means displays said at least one projection with a lightness or lightnesses according to a distance or distances from said virtual viewing point to said at least one window corresponding to said at least one projection.

4. The display device as claimed in claim 2, wherein:

said fourth means displays said at least one projection with a degree of transparency according to a distance or distances from said virtual viewing point to said at least one window corresponding to said at least one projection.

5. The display device as claimed in claim 1, wherein:

said first means moves said virtual viewing point in a plane parallel to said display screen; and said third means changes the position or positions of said at least one projection on said display screen according to the depth direction attribute or attributes of said at least one window corresponding to said at least one projection, when said virtual viewing point is moved by said first means.

6. The display device as claimed in claim 5, wherein:

said fourth means displays said at least one projection with a lightness or lightnesses according to a distance or distances from said virtual viewing point to said at least one window corresponding to said at least one projection.

7. The display device as claimed in claim 5, wherein:

said fourth means displays said projection with a degree of transparency according to a distance or distances from said virtual viewing point to said at least one window corresponding to said at least one projection.

8. The display device as claimed in claim 1, wherein:

said first means moves said virtual viewing point in a plane perpendicular to said display screen; and said third means changes a display scaling factor or factors of the at least one projection on said display screen according to the depth direction attribute or attributes of said at least one window corresponding to said at least one projection, when said virtual viewing point is moved by said first means.

9. The display device as claimed in claim 8, wherein:

said fourth means displays said at least one projection with a lightness or lightnesses according to a distance or distances from said virtual viewing point to said at least one window corresponding to said at least one projection.

10. The display device as claimed in claim 8, wherein:

said fourth means displays said at least one projection with a degree of transparency according to a distance or distances from said virtual viewing point to said at least one window corresponding to said at least one projection.

11. The display device as claimed in claim 1, wherein:

said fourth means displays said at least one projection with a lightness or lightnesses according to a distance or distances from said virtual viewing point to said at least one window corresponding to said at least one projection.

12. The display device as claimed in claim 1, wherein:

said fourth means displays said at least one projection with a degree of transparency according to a distance or distances from said virtual viewing point to said at least one window corresponding to said at least one projection.

* * * * *